United States Patent
Qin et al.

(10) Patent No.: US 9,982,816 B2
(45) Date of Patent: May 29, 2018

(54) PUP JOINT FOR RELEASING SIDEWALL CONTACT OF STRATIGRAPHIC TEST DEVICE AND APPARATUS

(71) Applicants: China National Offshore Oil Corp., Beijing (CN); China Oilfield Services Limited, Beijing (CN)

(72) Inventors: Xiaofei Qin, Sanhe (CN); Yongren Feng, Sanhe (CN); Wanguang Song, Sanhe (CN); Xiaodong Chu, Sanhe (CN); Lei Wang, Sanhe (CN)

(73) Assignees: China National Offshore Oil Corporation, Beijing (CN); China Oilfield Services Limited, Beijing (CN)

( * ) Notice: Subject to any disclaimer, the term of this patent is extended or adjusted under 35 U.S.C. 154(b) by 399 days.

(21) Appl. No.: 14/649,343

(22) PCT Filed: Nov. 20, 2013

(86) PCT No.: PCT/CN2013/087485
§ 371 (c)(1),
(2) Date: Jun. 3, 2015

(87) PCT Pub. No.: WO2014/086233
PCT Pub. Date: Jun. 12, 2014

(65) Prior Publication Data
US 2015/0316183 A1   Nov. 5, 2015

(30) Foreign Application Priority Data

Dec. 4, 2012  (CN) .......................... 2012 1 0514957

(51) Int. Cl.
*E21B 49/10* (2006.01)
*F16L 19/02* (2006.01)
(Continued)

(52) U.S. Cl.
CPC .............. *F16L 19/02* (2013.01); *E21B 49/00* (2013.01); *E21B 49/08* (2013.01); *E21B 49/10* (2013.01)

(58) Field of Classification Search
CPC ....................................... E21B 49/10
See application file for complete search history.

(56) References Cited

U.S. PATENT DOCUMENTS 4,860,580 A * 8/1989 DuRocher ............... E21B 49/10
166/264
6,157,893 A * 12/2000 Berger .................... E21B 49/10
702/12
(Continued)

FOREIGN PATENT DOCUMENTS

CN          1651717 A      8/2005
CN          2739347 Y      11/2005
(Continued)

*Primary Examiner* — David Bochna
(74) *Attorney, Agent, or Firm* — Ling Wu; Stephan Yang; Ling and Yang Intellectual Property

(57) ABSTRACT

A pushing and jam-releasing pup joint of a formation tester comprises a first jam-releasing arm (1), a first three-way reversing valve (V1), a two-way reversing valve (V2) and a third three-way reversing valve (V4), a withdrawal cavity (Q11) of the first jam-releasing arm (1) is connected with the first three-way reversing valve (V1) which can communicate with an energy accumulation cavity (NQ) of an energy accumulator and the two-way reversing valve (V2), the two-way reversing valve (V2) can be communicated with a pressure oil main line (G2) of a hydraulic system, and an extension cavity (Q12) of the first jam-releasing arm (1) is connected with the third three-way reversing valve (V4) which can communicate with the pressure oil main line (G2) and a return oil main line (G1) of hydraulic system. Jam-
(Continued)

releasing pup joint effectively solves the problem of jam release when mud adheres to EFDT and makes same jammed.

8 Claims, 4 Drawing Sheets

(51) Int. Cl.
*E21B 49/00* (2006.01)
*E21B 49/08* (2006.01)

(56) References Cited

U.S. PATENT DOCUMENTS

| | | |
|---|---|---|
| 2006/0207770 A1 | 9/2006 | Kotsonis et al. |
| 2008/0078582 A1* | 4/2008 | Phan ................. E21B 49/10 175/58 |
| 2009/0030858 A1* | 1/2009 | Hegeman ............. E21B 49/10 706/17 |
| 2009/0044951 A1* | 2/2009 | Milkovisch ........... E21B 49/10 166/369 |
| 2009/0049904 A1* | 2/2009 | Meister ................ E21B 49/10 73/152.23 |
| 2010/0132940 A1* | 6/2010 | Proett ................. E21B 49/10 166/250.17 |
| 2014/0174169 A1* | 6/2014 | Hejl ................... E21B 49/10 73/152.24 |

FOREIGN PATENT DOCUMENTS

| | | |
|---|---|---|
| CN | 1807902 A | 7/2006 |
| CN | 201202425 Y | 3/2009 |
| CN | 101408095 A | 4/2009 |
| CN | 101666228 A | 3/2010 |
| CN | 201539253 U | 8/2010 |
| CN | 103015994 A | 4/2013 |
| WO | WO 2001016460 A1 | 3/2001 |

* cited by examiner

PUP JOINT FOR RELEASING SIDEWALL CONTACT OF STRATIGRAPHIC TEST DEVICE AND APPARATUS

TECHNICAL FIELD

The invention relates to a formation testing device, particularly to a pushing and jam-releasing pup joint and device of a formation tester.

BACKGROUND OF THE RELATED ART

Wireline formation tester can easily lead to jamming of apparatus owing to the demand of apparatus structure and operation. The formation tester possesses a pushing and setting device and the device comprises a probe and a support arm. During borehole operation, the probe and support arm of the pushing and setting device are extended and contact the wall of a well, forming setting.

For measuring pressure and sampling at a fixed point location under a well, the time for logging often lasts for several hours, sometimes even tens of hours. Particularly, when the specific gravity of mud is larger and consequently the difference between formation pressure and mud column pressure in the wellhole reaches over 10 MPa, long-time operation at a fixed point location can easily lead to adhesion and jamming of the formation tester under the well. After the formation tester is jammed, the measurement must be interrupted to refloat apparatus, thus increasing the measurement cost and impacting the normal proceeding of measurement.

Enhanced Formation Dynamic Tester (EFDT) adopts the design of double probes and double support arms, reliable pushing mechanism ensures that the apparatus can release wireline for well logging during long-time operation under the well, avoiding mud adhering to the wireline and jamming, greatly reducing the chance of jamming of formation tester. But in the well where the pressure difference between formation pressure and mud column pressure in the wellhole is too large and mud cake is thick, EFDT apparatus will also suffer differential pressure sticking, by this time, even if releasing wireline for well logging, apparatus jamming cannot be avoided. Therefore, the technology of preventing jamming by releasing wireline used by EFDT at present cannot solve the problem of apparatus adhesion and jamming.

CONTENT OF THE INVENTION

In order to solve the problems present in prior arts, the invention provides a pushing and jam-releasing pup joint of a formation tester, comprising:

a first jam-releasing arm, which has a withdrawal cavity and an extension cavity;

a two-way reversing valve, which can be communicated with a pressure oil main line of a hydraulic system;

a first three-way reversing valve, which can be communicated with an energy accumulation cavity of an energy accumulator and said two-way reversing valve; and a third three-way reversing valve, which can be communicated with the pressure oil main line and a return oil main line of said hydraulic system; wherein:

the withdrawal cavity of said first jam-releasing arm is connected with said first three-way reversing valve and the extension cavity of the first jam-releasing arm is connected with said third three-way reversing valve.

Preferably, said pushing and jam-releasing pup joint can also comprise: a second jam-releasing arm, which has a withdrawal cavity and an extension cavity; and a second three-way reversing valve, which can be communicated with the pressure oil main line and the return oil main line of said hydraulic system; the withdrawal cavity of said second jam-releasing arm can be connected with said first three-way reversing valve and the extension cavity of said second jam-releasing arm can be connected with said second three-way reversing valve.

Preferably, the extension direction of said second jam-releasing arm can differ from the extension direction of said first jam-releasing arm.

Preferably, the extension direction of said second jam-releasing arm can be opposite to the extension direction of said first jam-releasing arm.

Preferably, a pipeline of the energy accumulation cavity of said energy accumulator can be equipped with a hydraulic pressure sensor.

The invention also provides a pushing and jam-releasing device of a formation tester, comprising at least one aforesaid pushing and jam-releasing pup joint.

Preferably, the extension direction of the first jam-releasing arm of said pushing and jam-releasing pup joint can differ from the extension direction of a probe and from the extension direction of a support arm of said formation tester.

Preferably, the extension direction of the second jam-releasing arm of said pushing and jam-releasing pup joint can be vertical to the extension direction of the probe or to the extension direction of the support arm of said formation tester.

Compared with relevant technologies, the invention can effectively solve the problem of jam release when mud adheres to Enhanced Formation Dynamic Tester and makes same jammed, thus increasing the safety of well logging using formation tester and reducing the risk of operation by formation tester under the well as far as possible.

Other features and advantages of the present invention will be set forth in the following description, and partly become more apparent from the description, or be understood by implementing the invention. The purpose and other advantages of the invention can be achieved and obtained by means of the structure specifically indicated in the description, claims and drawings.

BRIEF DESCRIPTION OF DRAWINGS

Drawings are for further understanding of the technical schemes of the present invention and constitute a part of the description, are used for explaining the technical schemes of the invention in combination with the embodiments of the invention, not for limit the technical schemes of the invention.

PREFERRED EMBODIMENTS OF THE INVENTION

Below the embodiments of the invention will be expounded in combination with drawings and embodiments, whereby the implementation procedure of the present invention solving technical problems by technical means and achieving technical effect can be fully understood and implemented. The embodiments of the invention and various features of the embodiments can be combined with one another under the premise of no confliction and all fall into the scope of protection of the invention.

Figure 1:
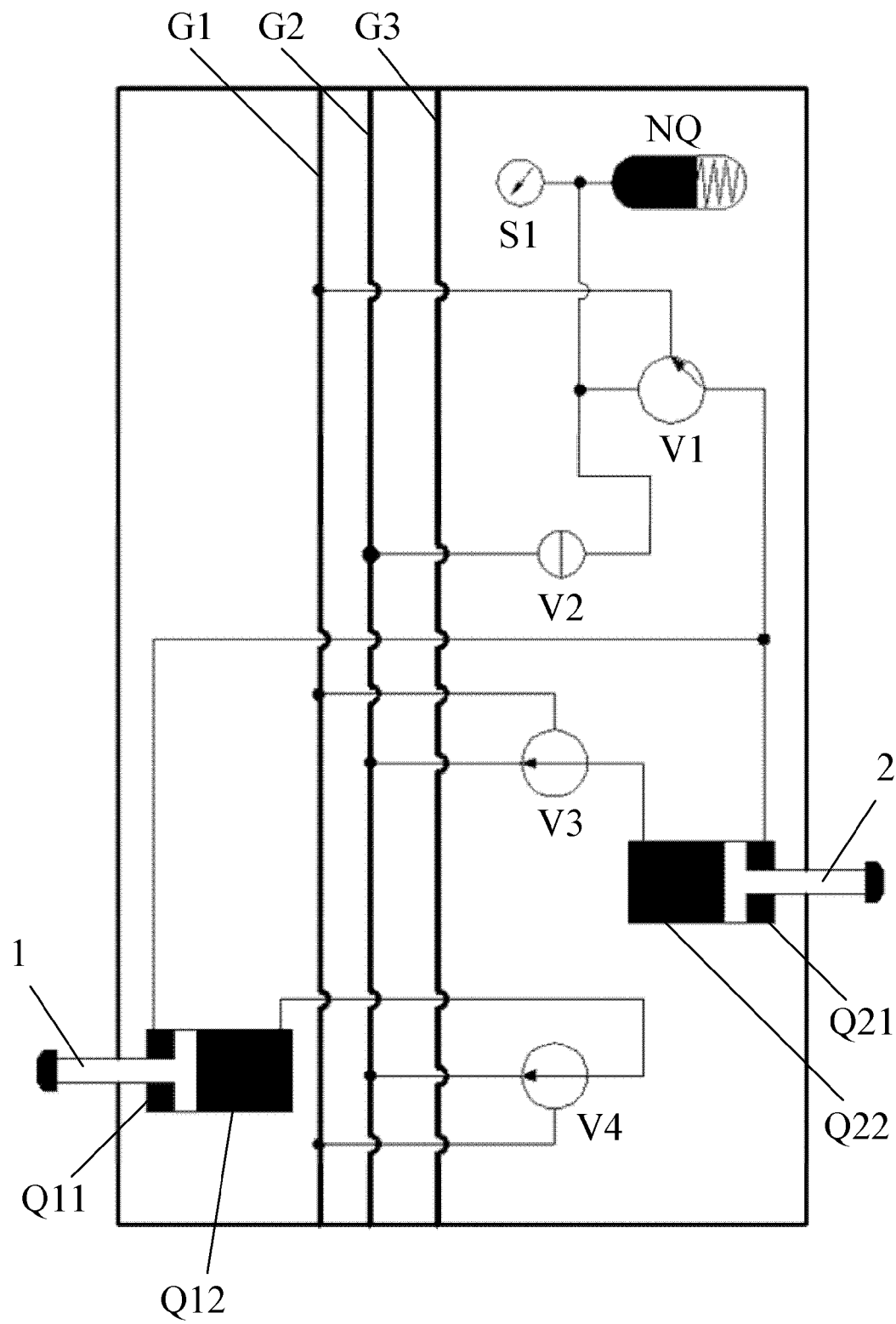
FIG. 1 is a diagram showing the pushing and jam-releasing pup joint of the formation tester working in an extended state of an embodiment of the invention.

As shown in FIG. 1, the pushing and jam-releasing pup joint of an embodiment of the invention mainly comprises a first jam-releasing arm 1, a first three-way reversing valve V1, a two-way reversing valve V2 and a third three-way reversing valve V4, and the like.

A withdrawal cavity Q11 (cavity with pole) of the first jam-releasing arm 1 is connected with the first three-way reversing valve V1 which can be communicated with an energy accumulation cavity NQ of an energy accumulator and the two-way reversing valve V2. The other end of the two-way reversing valve V2 can be communicated with a pressure oil main line G2 of a hydraulic system through a pressure oil line. An extension cavity Q12 (cavity without pole) of the first jam-releasing arm 1 is connected with the third three-way reversing valve V4 which can be communicated with the pressure oil main line G2 and a return oil main line G1 of the hydraulic system.

As shown in FIG. 1, in the pushing and jam-releasing pup joint of an embodiment of the invention, a pipeline of the energy accumulation cavity NQ of the energy accumulator is equipped with a hydraulic pressure sensor S1, the hydraulic pressure sensor S1 monitors the pressure of the energy accumulation cavity NQ of the energy accumulator in real time.

The pushing and jam-releasing pup joint of an embodiment of the invention can be installed on upside or underside of a EFDT probe pup joint (including EFDT single probe pup joint or double probe pup joint, etc.) in application. During installation with EFDT probe pup joint, the extension direction of the first jam-releasing arm 1 is different from the extension direction of the probe in the probe pup joint and from the extension direction of the support arm. In general, the extension direction of the probe in the probe pup joint is opposite to the extension direction of the support arm. When the pushing and jam-releasing pup joint of an embodiment of the invention is installed with EFDT probe pup joint, preferably, the extension direction of the first jam-releasing arm 1 is vertical to the extension direction of the probe in the probe pup joint or to the extension direction of the support arm. Certainly, the extension direction of the first jam-releasing arm 1 is vertical to the direction of axis of the pushing and jam-releasing pup joint at the same time. Thus, when the EFDT probe pup joint is adhered and jammed, the first jam-releasing arm can be controlled to extend and impose a lateral thrust to EFDT apparatus to release the apparatus from jamming.

As shown in FIG. 1, when the first jam-releasing arm 1 needs to extend to release jamming, the pushing and jam-releasing pup joint of an embodiment of the invention changes the direction of the first three-way reversing valve V1 and communicates the withdrawal cavity Q11 of the first jam-releasing arm 1 with the return oil main line G1 of the hydraulic system, and changes the direction of the third three-way reversing valve V4 and communicates the extension cavity Q12 of the first jam-releasing arm 1 with the pressure oil main line G2 of the hydraulic system, pushing out the first jam-releasing arm 1 using the high-pressure hydraulic oil in the pressure oil main line G2 until contacting the wall of the well and releasing jamming or reaching the maximum extension distance of the first jam-releasing arm 1. When the first jam-releasing arm 1 contacts the wall of the well to release jamming, pushing and setting the first jam-releasing arm 1 and the EFDT probe pup joint to form an angle (preferably right angle), a lateral thrust is imposed on the apparatus under differential pressure adhesion and jamming, so that the apparatus can be released from jamming.

Figure 2:
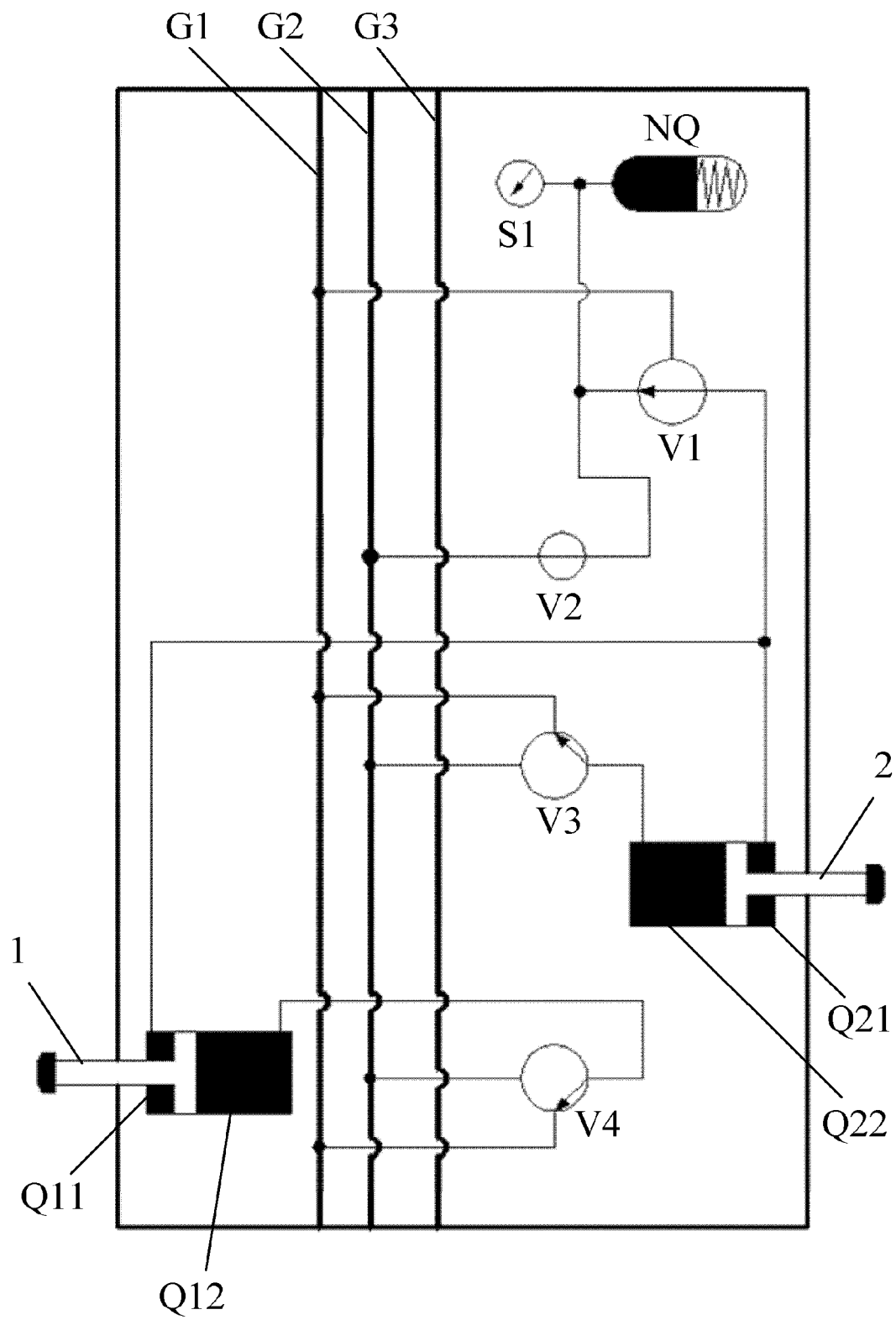
FIG. 2 is a diagram showing the pushing and jam-releasing pup joint of the formation tester working in a withdrawal state of an embodiment of the invention.

As shown in FIG. 2, when withdrawing the first jam-releasing arm 1 after releasing the apparatus from jamming, the direction of the third three-way reversing valve V4 is changed, the extension cavity Q12 of the first jam-releasing arm 1 is communicated with the return oil main line G1 of the hydraulic system, and the direction of the first three-way reversing valve V1 is changed and the withdrawal cavity Q11 of the first jam-releasing arm 1 is communicated with the energy accumulation cavity NQ of the energy accumulator and the outlet of the two-way reversing valve V2, then the direction of the two-way reversing valve V2 is changed to be communicated with the pressure oil main line G2, thus the first jam-releasing arm 1 is withdrawn.

Main line G3 shown in FIG. 1 and FIG. 2 is sample main line.

As shown in FIG. 1, the pushing and jam-releasing pup joint of an embodiment of the invention can also comprise a second jam-releasing arm 2 and a second three-way reversing valve V3. In general, the extension direction of the second jam-releasing arm 2 is different from the extension direction of the first jam-releasing arm 1 (in fact, same extension direction of the two is also practicable). Preferably, as shown in FIG. 1, the extension direction of the second jam-releasing arm 2 is opposite to the extension direction of the first jam-releasing arm 1. An withdrawal cavity Q21 (cavity with pole) of the second jam-releasing arm 2 is connected with the first three-way reversing valve V1 which can be communicated with an energy accumulation cavity NQ of an energy accumulator and the two-way reversing valve V2. An extension cavity Q22 (cavity without pole) of the second jam-releasing arm 2 is connected with the second three-way reversing valve V3 which can be communicated with the pressure oil main line G2 and the return oil main line G1 of the hydraulic system. Thus, the extension and withdrawal of the first jam-releasing arm 1 and the second jam-releasing arm 2 can be controlled separately.

Under the circumstances that the apparatus is not completely centered, when one of the two jam-releasing arms is completely extended, it probably cannot contact the wall of the well and thus cannot form a pushing counterforce to play the role of pushing and jam-releasing. In this case, the support arm on the other side is extended, forming a pushing counterforce by the other side contacting the wall of the well to ensure releasing jamming successfully.

Referring to aforesaid extension and withdrawal of the first jam-releasing arm 1, extension and withdrawal of the second jam-releasing arm 2 will not be described in detail here.

When the pushing and jam-releasing pup joint of an embodiment of the invention that comprises two jam-releasing arms is connected to EFDT (hitched to EFDT apparatus, for not only probe pup joint is connected, but other pup joint is needed to be connected to the other end) to release apparatus from jamming, one of the jam-releasing arms can be first controlled to extend to perform lateral pushing and jam-releasing. After successfully releasing the jam, the jam-releasing arm is withdrawn and the apparatus is lifted. Under the circumstances that the formation tester is decentered, when one of the two jam-releasing arms reaches its maximum extension distance and still cannot successfully contact the wall of the well to form an effective lateral pushing force, in this case, the other jam-releasing arm can be extended to perform pushing and jam-releasing from another direction, increasing the success rate of jam-release.

The energy accumulation cavity NQ of the energy accumulator maintains pressure all the time and the pressure value of the energy accumulation cavity NQ can be obtained by monitoring the hydraulic pressure sensor S1. After the jam-releasing arms are extended, if the control system is powered down or other emergent well conditions happen, the first three-way reversing valve V1 can automatically communicated with the energy accumulation cavity NQ of the energy accumulator and withdrawal cavities of the jam-releasing arms to automatically withdraw the jam-releasing arms, ensuring safety of operation of formation tester under the well.

The pushing and jam-releasing pup joint of an embodiment of the invention adopts a modular design and can achieve fast compatibility and seamless connection with EFDT apparatus through machinery, hydraulic and an electrical control bus design.

When the pushing and jam-releasing pup joint of an embodiment of the invention is applied, one pushing and jam-releasing pup joint can be installed on the upside and the underside of the EFDT probe pup joint respectively.

Figure 3:
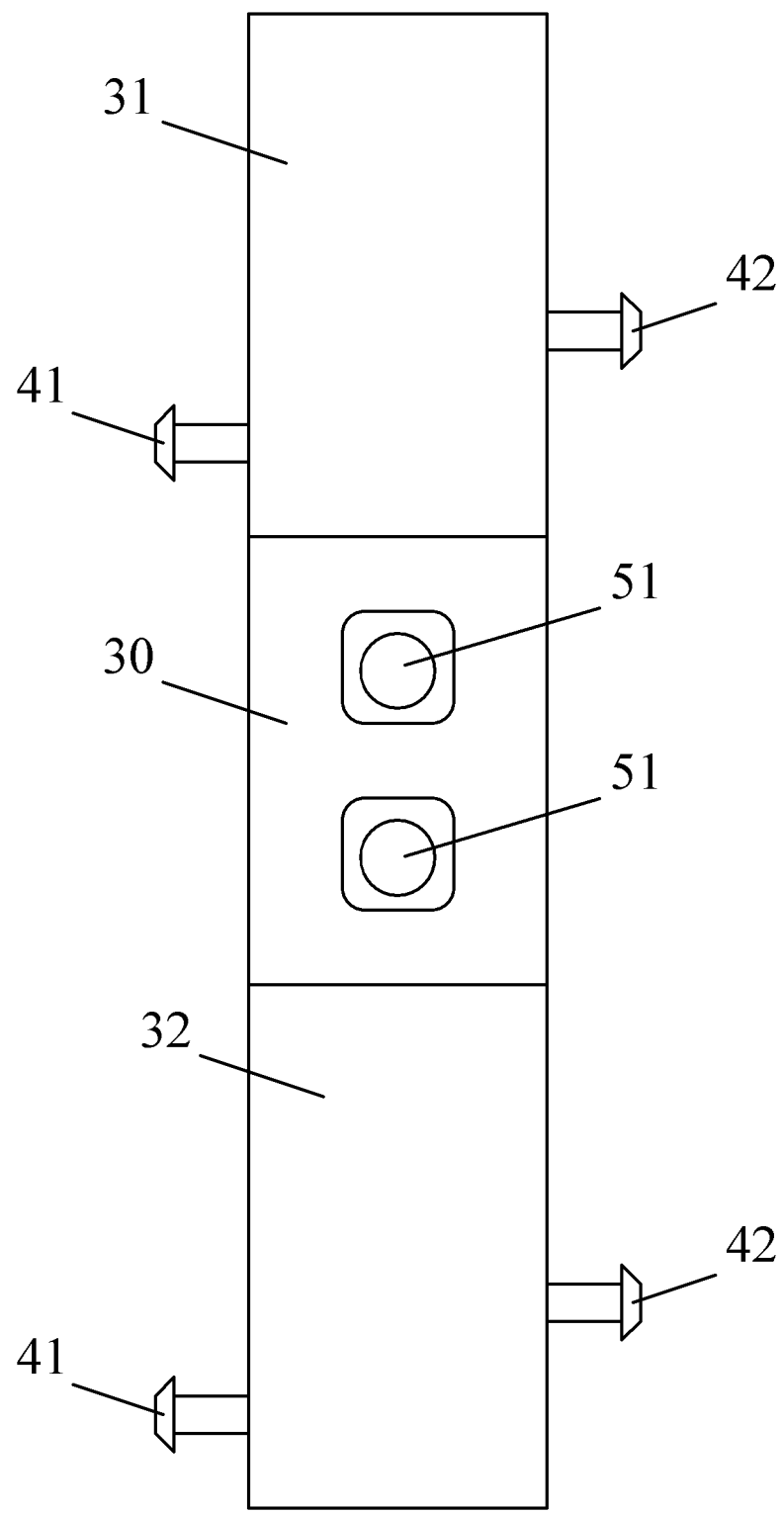
FIG. 3 is a diagram showing the installation and construction of the pushing and jam-releasing device of the formation tester of an embodiment of the invention.
Figure 4:
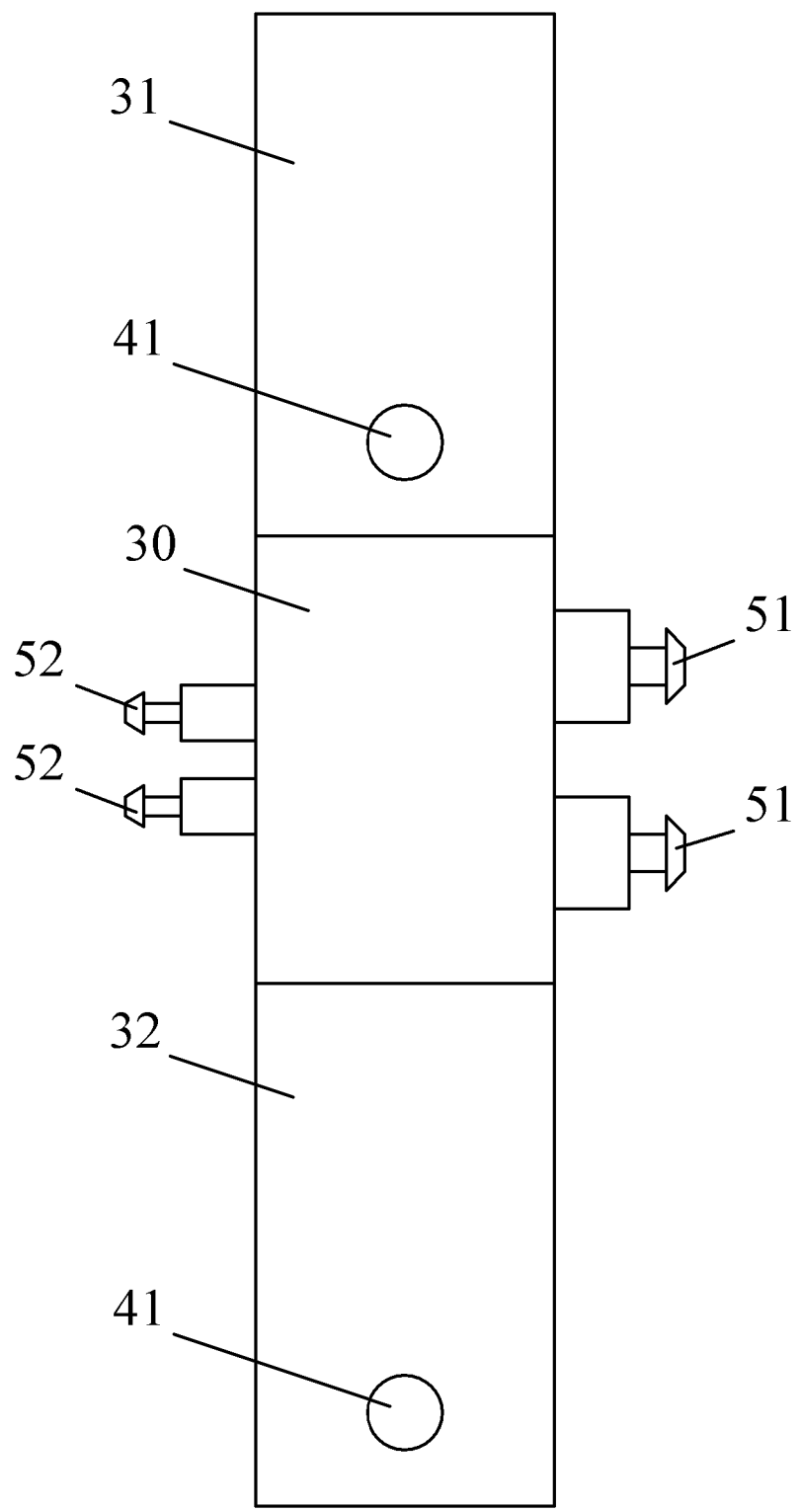
FIG. 4 is a profile diagram showing the installation and construction of the pushing and jam-releasing device of the formation tester of an embodiment of the invention.

As shown in FIG. 3 and FIG. 4, the pushing and jam-releasing device of the formation tester of an embodiment of the invention mainly comprises at least one first pushing and jam-releasing pup joint 31 on the upside of the EFDT probe pup joint 30 and at least one second pushing and jam-releasing pup joint 32 on the underside of the EFDT probe pup joint 30 installed in pairs. An embodiment of the invention takes one first pushing and jam-releasing pup joint 31 and one second pushing and jam-releasing pup joint 32 as an example to explain. The structure and operating principle of the first pushing and jam-releasing pup joint 31 and the second pushing and jam-releasing pup joint 32 are the same, please referring to the pushing and jam-releasing pup joint of embodiments of the invention shown in FIG. 1 and FIG. 2.

In an embodiment of the invention, two pushing and jam-releasing pup joints both comprise at least one jam-releasing arm. As embodiments of the invention in FIG. 3 and FIG. 4, the first pushing and jam-releasing pup joint 31 comprises a first jam-releasing arm 41 and a second jam-releasing arm 42, and the extension directions of the two jam-releasing arms are opposite. The second pushing and jam-releasing pup joint 32 also comprises a first jam-releasing arm 41 and a second jam-releasing arm 42, and the extension directions of the two jam-releasing arms are opposite and correspondently the same as or parallel to the extension directions of the two jam-releasing arms of the first pushing and jam-releasing pup joint 31.

In general, the extension directions of the jam-releasing arms of the first pushing and jam-releasing pup joint 31 and the second pushing and jam-releasing pup joint 32 both can be different from the extension direction of the probe of the EFDT probe pup joint 30 and from the extension direction of the support arm (in fact, it is also practicable that the extension directions of the jam-releasing arms of the two pushing and jam-releasing pup joints are same as the extension direction of the probe of the EFDT probe pup joint 30 or the extension direction of the support arm). Preferably, the extension directions of the two jam-releasing arms of the first pushing and jam-releasing pup joint 31 are vertical to the extension direction of a probe 51 of the EFDT probe pup joint 30 or to the extension direction of a support arm 52, and the extension directions of the two jam-releasing arms of the second pushing and jam-releasing pup joint 32 are also vertical to the extension direction of a probe 51 of the EFDT probe pup joint 30 or to the extension direction of a support arm 52.

When releasing the EFDT apparatus 30 from jamming, the first pushing and jam-releasing pup joint 31 on the upside and the second pushing and jam-releasing pup joint 32 on the underside work at the same time, both extending their jam-releasing arms of same direction. When the two pushing and jam-releasing pup joints both comprise at least two jam-releasing arms, preferably, the two both extend their jam-releasing arms of same direction at the same time on the upside and underside of the EFDT probe pup joint 30.

An embodiment of the invention can first push from one direction, if the jam is not released, performing pushing and jam-releasing again from another direction to increase the success rate of jam-releasing. In an emergency, the embodiment of the invention can automatically withdraw the jam-releasing arms in extended state, and can hydraulically lock in the direction of withdrawal when not pushing, thus not lead to automatic extension, ensuring the safety of operation of the formation tester.

While the embodiments disclosed in the invention are as above, the foregoing contents merely are embodiments employed for easy to understanding the present invention, and are not intended to limit the present invention. A person skilled in the art can make any modification and change to the forms and details of the embodiments without departing from the spirit and scope of the present invention, but the protection scope of the present invention shall subject to the scope defined by the appended claims.

INDUSTRIAL APPLICABILITY

The embodiments of the invention can effectively solve the problem of jam release when mud adheres to Enhanced Formation Dynamic Tester and makes same jammed by means of the pushing and jam-releasing device of a formation tester, thus increasing the safety of well logging using formation tester and reducing the risk of operation by formation tester under the well.

What we claim is:

1. A pushing and jam-releasing pup joint of a formation tester, comprising:
    a first jam-releasing arm (1), which has a withdrawal cavity (Q11) and an extension cavity (Q12);
    a two-way reversing valve (V2), which can be communicated with a pressure oil main line (G2) of a hydraulic system;
    a first three-way reversing valve (V1), which can be communicated with an energy accumulation cavity (NQ) of an energy accumulator and said two-way reversing valve (V2); and
    a third three-way reversing valve (V4), which can be communicated with the pressure oil main line (G2) and a return oil main line (G1) of said hydraulic system;
    wherein:
    the withdrawal cavity (Q11) of said first jam-releasing arm (1) is connected with said first three-way reversing valve (V1) and the extension cavity (Q12) of the first jam-releasing arm (1) is connected with said third three-way reversing valve (V4).

2. The pushing and jam-releasing pup joint of a formation tester according to claim 1, also comprising:
    a second jam-releasing arm (2), which has a withdrawal cavity (Q21) and an extension cavity (Q22); and a second three-way reversing valve (V3), which can be communicated with the pressure oil main line (G2) and the return oil main line (G1) of said hydraulic system;

wherein, the withdrawal cavity (Q21) of said second jam-releasing arm (2) is connected with said first three-way reversing valve (V1) and the extension cavity (Q22) of said second jam-releasing arm (2) is connected with said second three-way reversing valve (V3).

3. The pushing and jam-releasing pup joint of a formation tester according to claim 2, wherein, the extension direction of said second jam-releasing arm (2) is different from the extension direction of said first jam-releasing arm (1).

4. The pushing and jam-releasing pup joint of a formation tester according to claim 3, wherein, the extension direction of said second jam-releasing arm (2) is opposite to the extension direction of said first jam-releasing arm (1).

5. The pushing and jam-releasing pup joint of a formation tester according to claim 1, wherein, a pipeline of the energy accumulation cavity (NQ) of said energy accumulator is equipped with a hydraulic pressure sensor (S1).

6. A pushing and jam-releasing device of a formation tester, comprising at least one pushing and jam-releasing pup joint as said in claim 1.

7. The pushing and jam-releasing device according to claim 6, wherein, the extension direction of the first jam-releasing arm (1) of said pushing and jam-releasing pup joint is different from the extension direction of a probe and from the extension direction of a support arm of said formation tester.

8. The pushing and jam-releasing device according to claim 7, wherein, the extension direction of the first jam-releasing arm (1) of said pushing and jam-releasing pup joint is vertical to the extension direction of the probe or to the extension direction of the support arm of said formation tester.

* * * * *